US011276250B2

(12) United States Patent
Deng et al.

(10) Patent No.: US 11,276,250 B2
(45) Date of Patent: Mar. 15, 2022

(54) RECOGNITION FOR OVERLAPPED PATTERNS

(71) Applicant: International Business Machines Corporation, Armonk, NY (US)

(72) Inventors: Xue Mei Deng, Beijing (CN); Ang Yi, Beijing (CN); Jun Hong Zhao, ShanghDi (CN); Lu Huang, Beijing (CN); Ya Juan Tong, Beijing (CN); Hui Huang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 310 days.

(21) Appl. No.: 16/661,190

(22) Filed: Oct. 23, 2019

(65) Prior Publication Data

US 2021/0124907 A1    Apr. 29, 2021

(51) Int. Cl.
*G06V 20/64* (2022.01)
*G06V 10/94* (2022.01)
*G06V 10/10* (2022.01)

(52) U.S. Cl.
CPC .......... *G06V 20/653* (2022.01); *G06V 10/955* (2022.01); *G06V 10/16* (2022.01); *G06V 10/17* (2022.01); *G06V 2201/12* (2022.01)

(58) Field of Classification Search
USPC .................... 382/154, 178; 345/467; 715/273
See application file for complete search history.

(56) References Cited

U.S. PATENT DOCUMENTS

| | | | | |
|---|---|---|---|---|
| 5,848,184 A | * | 12/1998 | Taylor | G06V 30/414 382/173 |
| 6,031,941 A | * | 2/2000 | Yano | G06T 7/571 382/154 |
| 6,975,352 B2 | * | 12/2005 | Seeger | H04N 5/23238 348/218.1 |
| 7,924,284 B2 | * | 4/2011 | Ewanchuk | G06T 11/203 345/443 |

(Continued)

FOREIGN PATENT DOCUMENTS

| WO | 2016133412 A1 | 8/2016 |
|---|---|---|
| WO | 2016175666 A1 | 11/2016 |

OTHER PUBLICATIONS

El Harraj et al., "An improved Algorithm for Document Image Enhancing", 2016 International Conference on Computational Science and Computational Intelligence, © 2016 IEEE, 6 pages.

(Continued)

*Primary Examiner* — Kathleen Y Dulaney
(74) *Attorney, Agent, or Firm* — Stephanie L. Carusillo

(57) ABSTRACT

In an approach, data of a plurality of points is sampled in a target area, wherein the data of each point of the plurality of points comprises position information and a height value. A first area of a target area is determined, wherein the height value of each point of the plurality of points in the first area complies with a first range. A second area of the target area is determined, wherein the height value of each point of the plurality of points in the second area complies with a second range. A third area of the target area is determined, wherein the height value of each point of the plurality of points in the third area complies with a third range. A first pattern is generated, wherein the first pattern is a combination of the first area and the third area.

17 Claims, 7 Drawing Sheets

(56) References Cited

U.S. PATENT DOCUMENTS

| | | | | |
|---|---|---|---|---|
| 8,116,574 B2* | 2/2012 | Engels | G06K 9/6254 | 382/224 |
| 8,818,076 B2* | 8/2014 | Shenkar | G06T 17/05 | 382/154 |
| 2009/0080773 A1* | 3/2009 | Shaw | G06T 7/41 | 382/173 |
| 2010/0111358 A1* | 5/2010 | Chai | G06V 40/20 | 382/103 |
| 2011/0249887 A1* | 10/2011 | Fujita | H04N 13/128 | 382/154 |
| 2011/0293180 A1* | 12/2011 | Criminisi | G06T 7/11 | 382/173 |
| 2012/0294516 A1* | 11/2012 | Lee | G06T 7/579 | 382/162 |
| 2012/0294521 A1* | 11/2012 | Lee | G06T 7/579 | 382/164 |
| 2013/0106845 A1* | 5/2013 | Ko | H04N 13/128 | 345/419 |
| 2013/0136337 A1* | 5/2013 | Asente | G06T 19/20 | 382/154 |
| 2013/0315455 A1* | 11/2013 | Wakai | A61B 8/5215 | 382/128 |
| 2014/0099017 A1* | 4/2014 | Tsai | G06T 17/00 | 382/154 |
| 2014/0169701 A1* | 6/2014 | Cui | G06T 3/4053 | 382/299 |
| 2015/0093029 A1* | 4/2015 | Tijssen | G06T 11/00 | 382/173 |
| 2016/0005181 A1* | 1/2016 | Cordara | G06T 7/11 | 382/154 |
| 2016/0071281 A1* | 3/2016 | Cordara | G06T 7/11 | 382/154 |
| 2016/0171684 A1* | 6/2016 | De Haan | G06T 7/0012 | 382/103 |
| 2016/0171706 A1* | 6/2016 | Somanath | G06T 7/194 | 382/154 |
| 2016/0180195 A1* | 6/2016 | Martinson | G06V 20/653 | 382/103 |
| 2018/0039857 A1 | 2/2018 | Kumar | | |

OTHER PUBLICATIONS

Mell et al., "The NIST Definition of Cloud Computing", National Institute of Standards and Technology U.S. Department of Commerce, Special Publication 800-145, Sep. 2011, 7 pages.

* cited by examiner

RECOGNITION FOR OVERLAPPED PATTERNS

BACKGROUND

The present invention relates to pattern recognition technology, and more specifically, to overlapped pattern recognition based on a three-dimensional (3D) scanner.

Pattern recognition is the automated recognition of patterns and regularities in data. Pattern recognition is closely related to artificial intelligence and machine learning. However, these can be distinguished: machine learning is one approach to pattern recognition, while other approaches include hand-crafted (not learned) rules or heuristics; and pattern recognition is one approach to artificial intelligence, while other approaches include symbolic artificial intelligence.

Pattern recognition systems are in many cases trained from labeled "training" data (supervised learning), but when no labeled data is available, other algorithms can be used to discover previously unknown patterns (unsupervised learning). In pattern recognition, there may be a higher interest to formalize, explain and visualize the pattern, while machine learning traditionally focuses on maximizing the recognition rates. Pattern recognition algorithms generally aim to provide a reasonable answer for all possible inputs and to perform "most likely" matching of the inputs, considering their statistical variation.

In machine learning, pattern recognition is the assignment of a label to a given input value. An example of pattern recognition is classification, which attempts to assign each input value to one of a given set of classes (for example, determine whether a given email is "spam" or "non-spam"). However, pattern recognition is a more general problem that encompasses other types of output as well. Other examples are regression, which assigns a real-valued output to each input; sequence labeling, which assigns a class to each member of a sequence of values (for example, part of speech tagging, which assigns a part of speech to each word in an input sentence); and parsing, which assigns a parse tree to an input sentence, describing the syntactic structure of the sentence.

SUMMARY

According to one embodiment of the present invention, there is provided a computer-implemented method. According to the method, data of a plurality of points sampled in a target area is obtained, wherein the data of each point of the plurality of points comprises position information and a height value, and wherein the position information indicates a position of a respective point in a reference plane of the target area and the height value indicates a vertical distance of the respective point to the reference plane. A first area of a target area is determined, wherein the height value of each point of the plurality of points in the first area complies with a first range. A second area of the target area is determined, wherein the height value of each point of the plurality of points in the second area complies with a second range. A third area of the target area is determined, wherein the height value of each point of the plurality of points in the third area complies with a third range. A first pattern is generated, wherein the first pattern is a combination of the first area and the third area.

Further, computer program products and systems are also provided according to embodiments of the present invention.

These and other features and advantages of the present invention will be described in or will become apparent to those of ordinary skill in the art in view of the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
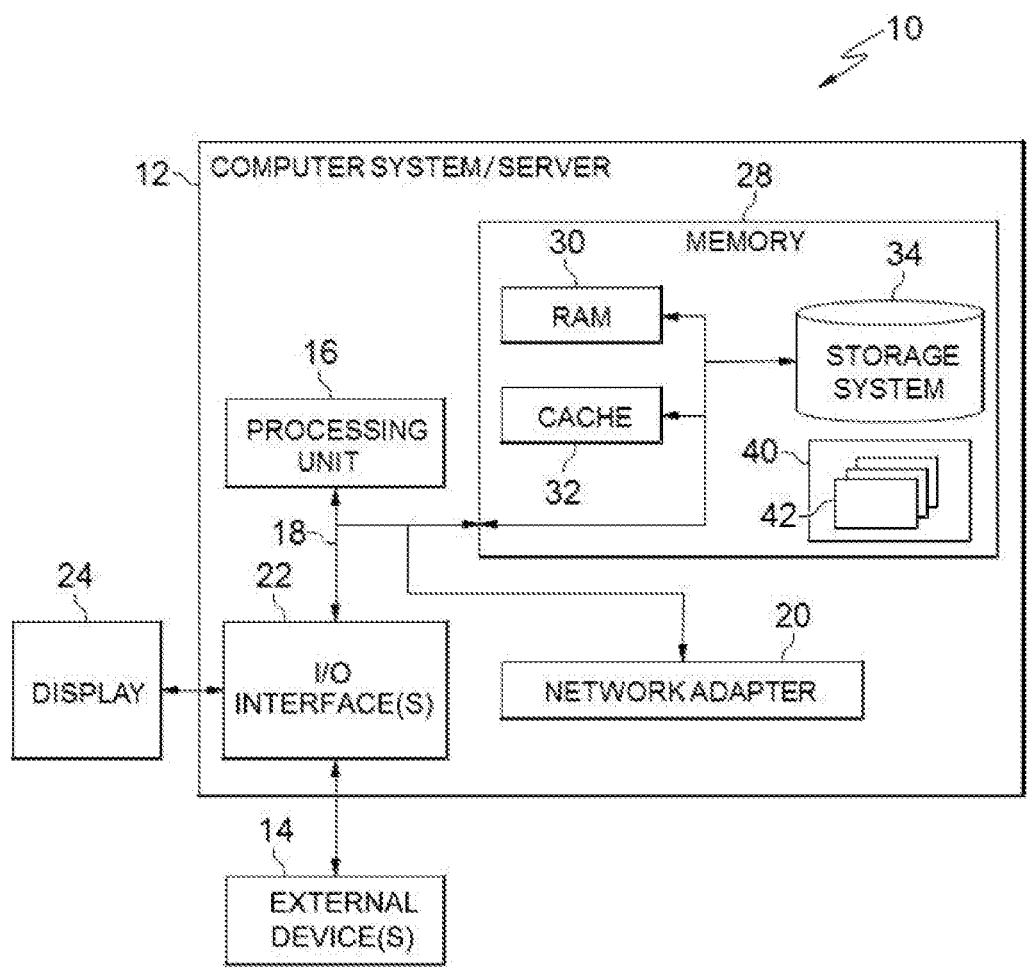
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
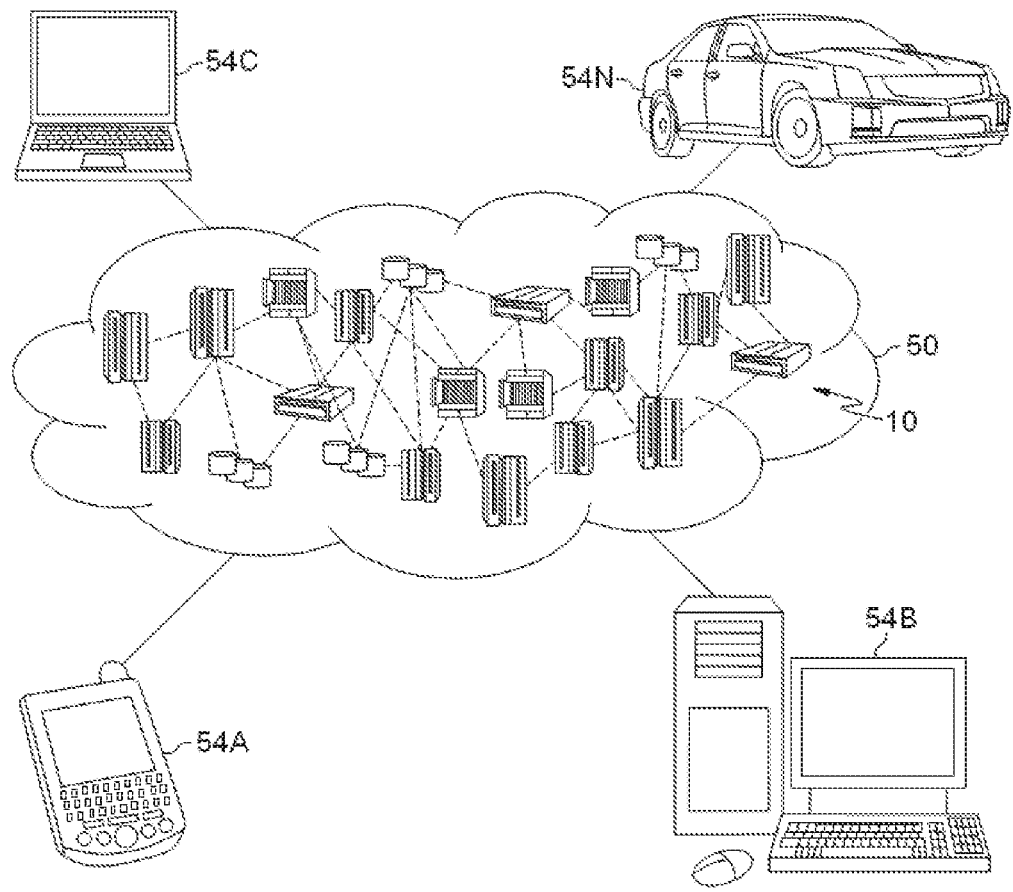
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
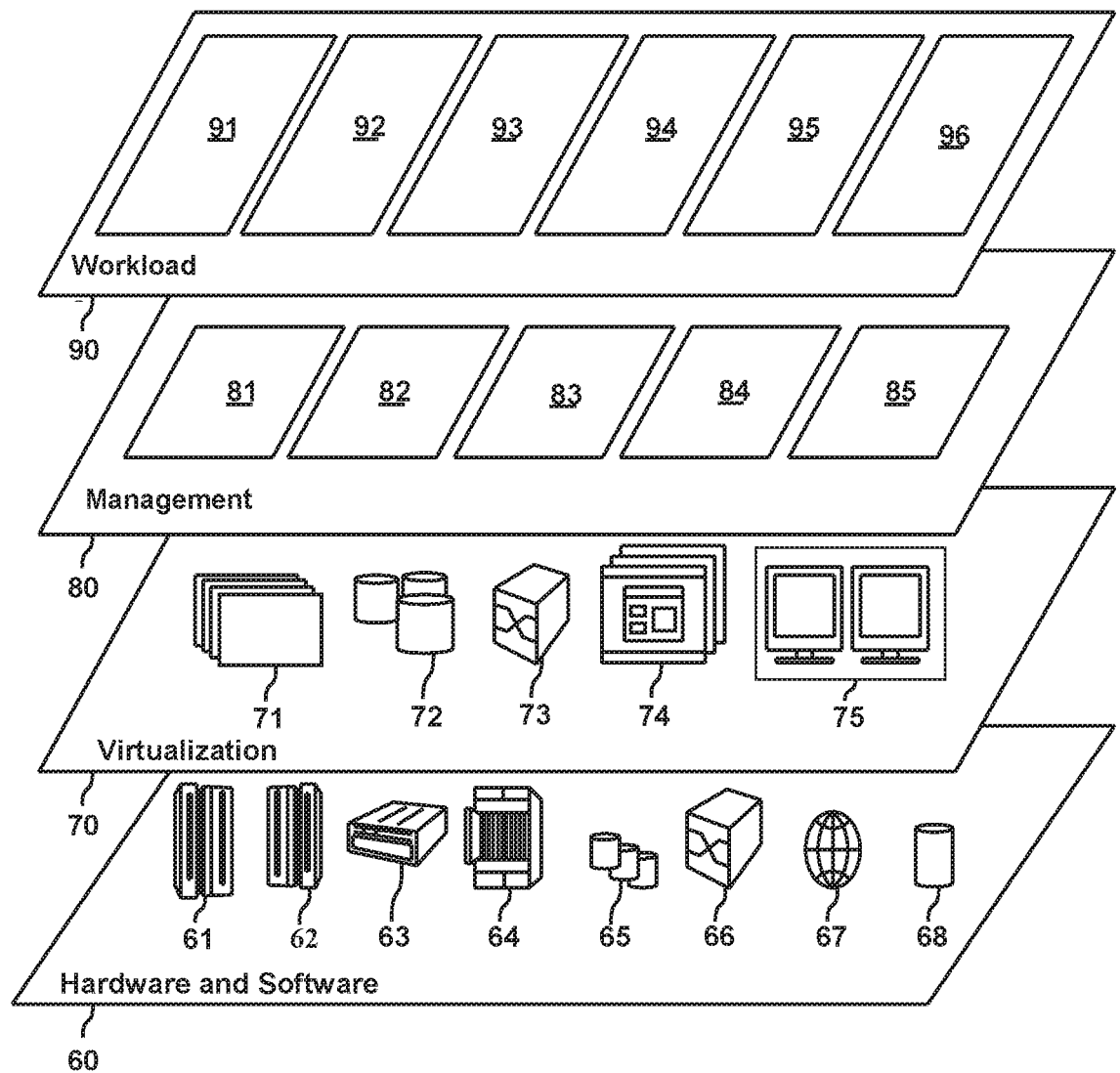
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some exemplary embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pattern recognition processing 96.

Figure 4:
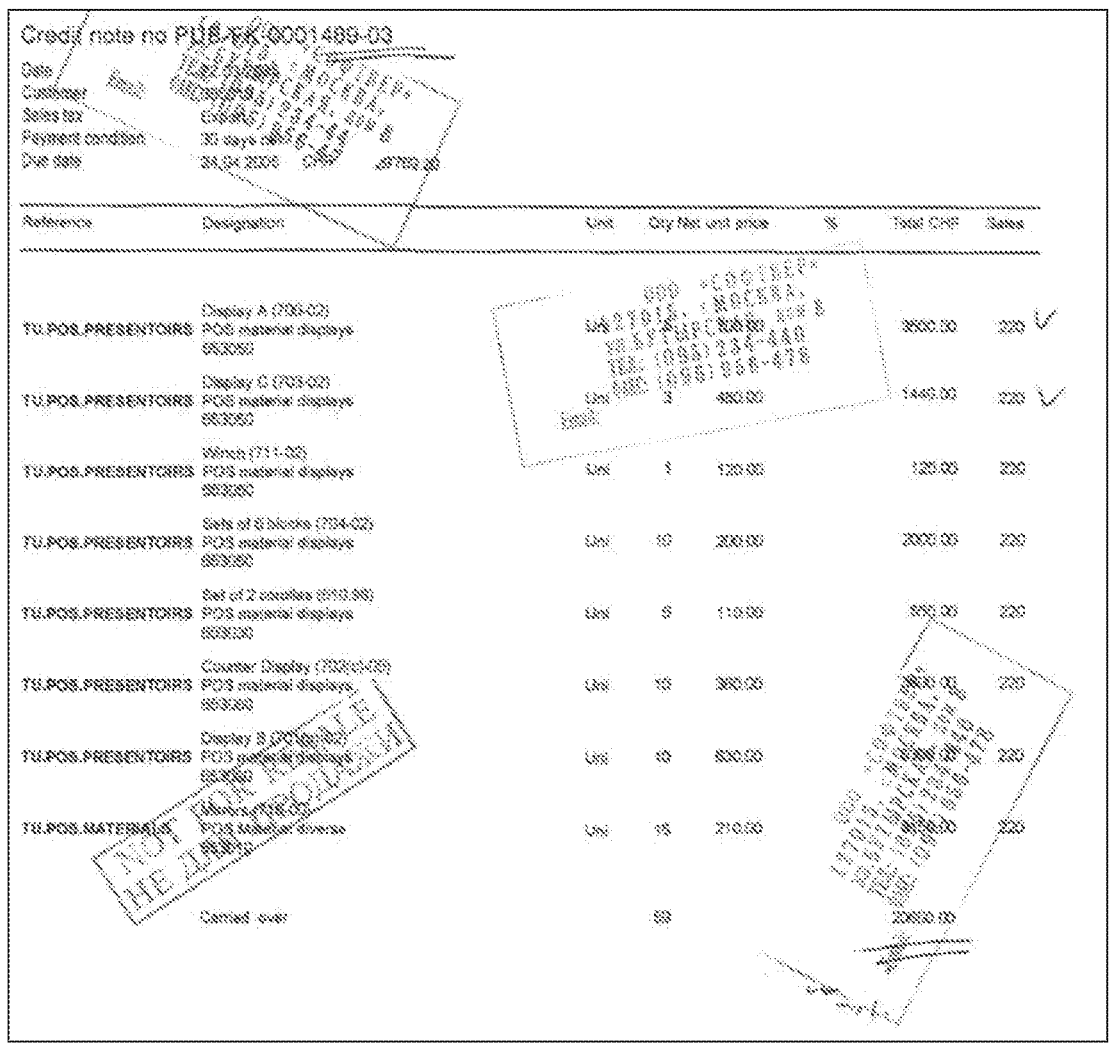
FIG. 4 shows an example picture according to an embodiment of the present invention.

Embodiments of the present invention recognize that pattern recognition technologies are widely used. Taking Optional Character Recognition (OCR) technology as an example, OCR technology can process scanned pictures and/or photos to recognize characters within the pictures and/or photos. OCR technology is very useful when the images are clear without noise. However, in the case where different characters are overlapped, noises might occur during an OCR process and cause the characters not to be able to be recognized correctly. For example, FIG. 4 shows a picture in which different characters are overlapped. FIG. 4 depicts a printed list with several stamps on the printed list, so a lot of characters in the printed list are overlapped by the characters in the stamps. In this situation, current OCR technologies will not serve well as they cannot recognize overlapped parts of characters. As such, neither the characters in the stamps nor the characters in the printed list could be well recognized. Embodiments of the present invention recognize that a more feasible way to generate corrected patterns for the overlapped patterns is needed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "target area", according to embodiments of the invention, can be an area comprising an object to be scanned and recognized, wherein the object comprises at least one overlapped pattern. According to embodiments of the invention, a plurality of points in a target area are sampled. To better address the recognition of overlapped patterns, besides the position information of each point sampled within a target area, embodiments of the invention further sample a height value of each point sampled within the target area. That is to say, data of a point sampled will comprise its position information as well as its height value. Details will be introduced with reference to FIGS. 5-7.

Figure 5:
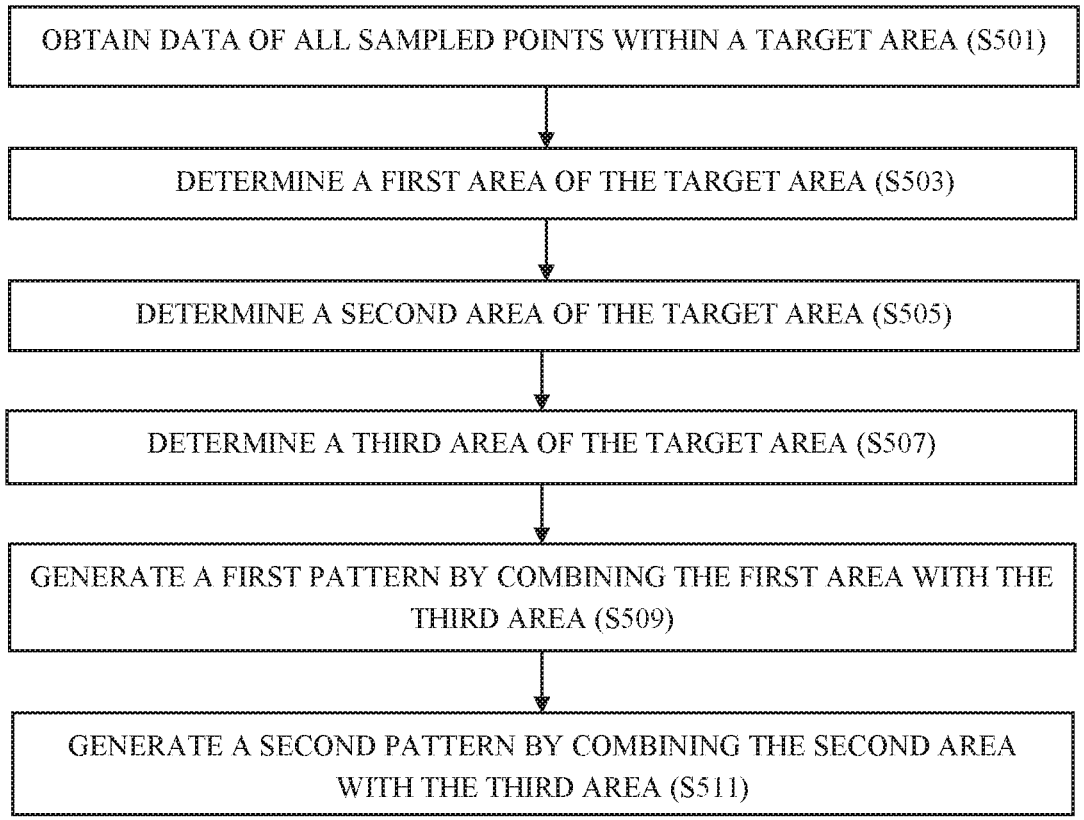
FIG. 5 shows a flowchart of a method for generating corrected patterns from overlapped patterns according to an embodiment of the present invention.

FIG. 5 shows a flowchart of a method 500 for generating corrected patterns from overlapped patterns according to an embodiment of the present invention, wherein each of the overlapped patterns has a substantially consistent ink type. The method 500 starts at S501, in which data of points sampled in a target area is obtained, wherein: the data of each point comprises position information and a height value of the respective point, the position information indicates a position of the respective point in a reference plane of the target area, and the height value indicates a vertical distance of the respective point to the reference plane. The target area can be an area comprising an object to be scanned and recognized. In some embodiments, a point may correspond to a sub area in the target area. For example, the point can be sampled in the center or corners of the sub area. Sizes of sub areas can be set according to the required recognition accuracy. The smaller the size of a sub area is, the more points can be sampled in the target area. Accordingly, more accurate recognition can be achieved.

In some embodiments, the position of a point could be expressed using a coordinate system established in a reference plane of the target area. Points sampled in the target area can be mapped to coordinates in the coordinate system of the reference plane. The origin of the coordinate system can correspond to a selected position in the target area, i.e., the center position of the target area, the lower-left corner position of the target area, the lower-right corner position of the target area, etc. The x-axis of the coordinate system has a first direction in the reference plane of the target area, while the y-axis of the coordinate system can follow a second direction in the reference plane of the target area that is vertical to the first direction in the reference plane. In some further embodiments, the reference plane of the target area could be parallel to or set as the bottom surface plane of the target area. The x-axis and y-axis scales can be configured according to the size of the target area. For example, a length of one millimeter in the target area can be mapped to one scale in the x-axis and/or one scale in the y-axis in the coordinate system. The position of a point can be expressed as a combination of an x value (i.e. x-axis value) and a y value (i.e. y-axis value) of the point in the coordinate system in the reference plane. In some embodiments, the height value of a point could be expressed by a z value of the point, and the z value refers to a distance value of the point vertical to the reference plane. In some embodiments, the reference plane could be set as the bottom surface plane of the target area. In a further embodiment, x, y and z value could be obtained by, for example, a 3D scanner.

Figure 6:
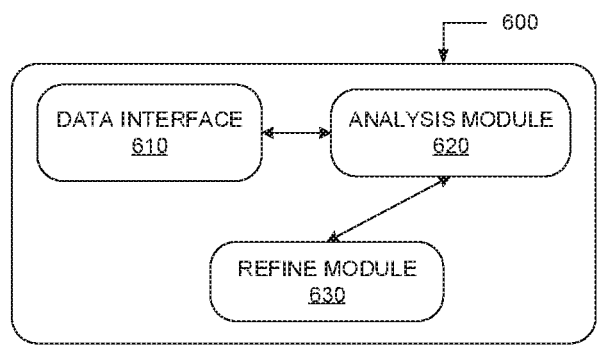
FIG. 6 depicts a schematic diagram of an example of overlapped patterns processing system according to an embodiment of the present invention.

In some embodiments, data of a point cloud within a target area is obtained at S501. In some embodiments, the data of a point could be obtained from a 3D scanner through the data interface 610 as shown in FIG. 6, which will be described later. The target area is an area comprising an object to be scanned and recognized. A point cloud is a database storing data of points in a 3D coordinate system. A point cloud is a very accurate digital record of an object or space and saved in a form of a very large number of points that cover surfaces of the target object. In some embodiments, the data of each point at least comprises x, y, z values of the point, wherein the x and y values are the coordinate representation of the point's position in the target area, and the z value indicates a height value of the point on the target area surface.

Figure 7A:
FIG. 7A depicts an example of a target area according to an embodiment of the present invention.

FIG. 7A shows an example of a target area. In this example, the area comprising overlapped characters shown in FIG. 7A is a target area. Data of points in the target area could be obtained in the step S501.

In some embodiments, an object (i.e., the object as shown in FIG. 4) that is to be laser scanned is placed on the bed of a digitizer. The whole object or parts of the object can be scanned as the target area. In some embodiments, a specialized software could drive a laser probe above the surface of the target area. The laser probe projects a line of laser light onto the surface. When sweeping along the object, a plurality of sensor cameras continuously records the changing distance and shape of the laser line in three dimensions (x, y, z). Since the laser moves around and captures the entire surface shape of the object, the shape of the object appears as millions of points called a "point cloud" on the computer monitor. The whole process is very fast and very precise. It could be understood that any other suitable technology, either currently known or to be developed in future, can be applied to obtain the data of the point cloud within the target area.

Figure 7B:
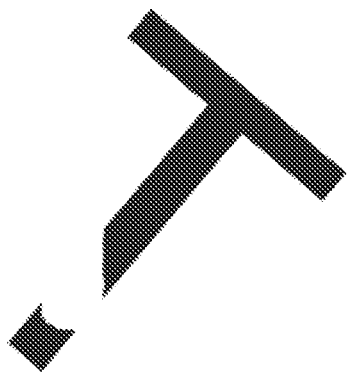
FIG. 7B depicts an example of a first area according to an embodiment of the present invention.

The method continues with S503, in which a first area of the target area is determined, wherein height values of points in the first area fit a first range. In some embodiments, the height value of a point could be expressed by a z value of the point. In some embodiments, a range corresponding to a specific area could be a value scope corresponding to the ink type of the area. As such, a range corresponding to the first area could be determined based on the ink type of the first area. In some embodiments, a range corresponding to an area covered by a specific ink type could be pre-determined based on the specific ink type. As such, a first range corresponding to the first area could be obtained based on the ink type of the first area. Then z values of all points could be compared with the value scope of the first range, and those points with z values that fall into the scope of the first range could be determined accordingly. In some embodiments, as x, y and z values of all points are obtained in S501, the z values of all points could be compared with the first range, and then a first group of points could be determined, wherein z values of all points in the first group are within the value scope of the first range. In some further embodiments, x values and y values of all points in the first group could be determined accordingly. In this way, the first area is determined based on the x value and y value of all points in the first group. In this way, the object as shown in FIG. 7B is determined as the first area of the target area as shown in FIG. 7A. In some further embodiments, the range corresponding to a specific ink type could be adjusted based on machine-learning technologies. It could be understood that any suitable machine-learning technology, either currently known or to be developed in future, can be applied to adjust the range of a specific ink type.

In some further embodiments, the first area could be updated by excluding noise points from all the points in the first area as there might be some noise points in the first area, although z values of these points fit the first range condition too. In some further embodiments, a first minimum area could be determined first. The first minimum area is a minimum area that can represent a main texture feature of the first area. Then, the rest part of the first area could be divided into a plurality of candidate areas, each of which has the same shape with the first minimum area. Then, a texture feature of each of the plurality of candidate areas could be compared with a texture feature of the first minimum area. In response to the text feature of a respective candidate area not matching the text feature of the first minimum area, the respective candidate area can be excluded from the first area. In this way, an updated first area could be determined by excluding the noise points. In an alternative embodiment, the first area could be divided into a plurality of sub areas. The texture feature of each of the plurality of sub areas could be analyzed and determined. In this way, the one or more sub areas whose texture features are different from the remaining sub areas could be determined. Then, the one or more sub areas could be excluded as areas with noise points from the first area. It could be understood that any other suitable technology, either currently known or to be developed in future, can be applied to exclude the noise points.

Figure 7C:
FIG. 7C depicts an example of a second area according to an embodiment of the present invention.

The method continues with S505, in which a second area of the target area is determined, wherein height values of points in the second area fit a second range condition. In some embodiments, the height value of a point is expressed by a z value of the point. In some embodiments, a range corresponding to a specific area could be a value scope corresponding to the ink type of the area. As such, the second range corresponding to the second area could be determined based on the ink type of the second area. In some embodiments, a range corresponding to an area covered by a specific ink type could be pre-determined based on the specific ink type. The second range corresponding to the second area could be obtained based on the ink type of the second area. Then z values of all points could be compared with the value scope of the second range, and those points with z values that fall into the scope of the second range could be determined accordingly. In some embodiments, as x, y and z values of all points are obtained in S501, the z values of all points could be compared with the second range, and then a second group of points could be determined, wherein z values of all points in the second group are within the value scope of the second range. In some further embodiments, x values and y values of all points in the second group could be determined accordingly. In this way, the second area is determined based on the x value and y value of all points in the second group. In this way, the object as shown in FIG. 7C is determined as the second area of the target area as shown in FIG. 7A. In some further embodiments, the range corresponding to a specific ink type could be adjusted based on machine-learning technologies. It could be understood that any suitable machine-learning technology, either currently known or to be developed in future, can be applied to adjust the range of a specific ink type.

In some further embodiments, the second area could be updated by excluding noise points from all the points of the second area as there might be some noise points in the second area although the z values of these points fit the second range too. In some further embodiments, a second minimum area could be determined first. The second minimum area is a minimum area that can represent a main texture feature of the second area. Then, the rest part of the first area could be divided into a plurality of candidate areas, each of which has the same shape with the second minimum area. Then, a texture feature of each of the plurality of candidate areas could be compared with a texture feature of the second minimum area. In response to the text feature of a candidate area not matching the text feature of the second minimum area, the candidate area can be excluded from the second area. In this way, an updated second area could be determined by excluding the noise points. In an alternative embodiment, the second area could be divided into a plurality of sub areas. The texture feature of each of the plurality of sub areas could be analyzed and determined. In this way, the one or more sub areas whose texture features are different from the remaining sub areas could be determined. Then, the one or more sub areas could be excluded as areas with noise points from the second area. It could be understood that any other suitable technology, either currently known or to be developed in future, can be applied to exclude the noise points.

The method continues with S507, in which a third area is determined. In some embodiments, a crossed area of the first area and the second area is determined first. FIG. 7C shows an example of a crossed area. The crossed area is the remaining area of the target area excluding the first area and the second area. In some embodiments, the crossed area could be determined as the third area directly.

Figure 7D:
FIG. 7D depicts an example of a third area according to an embodiment of the present invention.

In a further embodiment, a third range is determined. In some embodiments, the third range is the sum of the first range and the second range. The sum here means the value of the third range is within a range scope of the actual sum of the first range value and the second range value. For example, in a condition the first range is [t11, t12] and the second range is [t21, t22], then the third range could be [t11+t21, t12+t22]. In some embodiments, range deviation can be considered. For example, the third range could be set as [(t11+t21)*(1±d %), (t12+t22)*(1±d %)], wherein d % can be configured according to actual needs, such as, 5%, 10%, etc. In some further embodiments, the range scope could be determined by an expert, or determined based on machine-learning technology. Then for the crossed area, all points whose z values fall in the value scope of the third range are determined accordingly. In some embodiments, as x, y, and z values of all points are obtained in S501, the z values of all points in the crossed area could be compared with the third range, and then, a third group of points could be determined, wherein z values of all points in the third group are within the value scope of the third range. In some further embodiments, the x value and y value of all points in the third group could be determined accordingly. In this way, the third area is determined based on the x value and y value of all points in the third group. In some alternative embodiments, z values of all points in the target area are compared with the third range to determine the third group, and the third area could be determined accordingly. In some further embodiments, the texture feature of the third area is consistent with the texture feature of the first area or the second area. For the example target area as shown in FIG. 7A, the object as shown in FIG. 7D is determined as the third area.

Figure 7E:
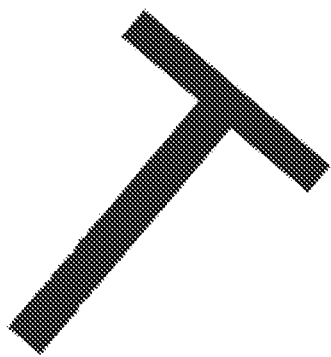
FIG. 7E depicts an example of a generated first pattern according to an embodiment of the present invention.

The method continues with S509, in which the first area is combined with the third area to generate a first pattern. In some embodiments, the first pattern can be a character. As an example, the first area as shown in FIG. 7B can be combined with the third area as shown in FIG. 7D to generate a first pattern as shown in FIG. 7E. In a further embodiment, the color of the third area in the first pattern could be adjusted to the same as the first area in the first pattern.

Figure 7F:
FIG. 7F depicts an example of a generated second pattern according to an embodiment of the present invention.

The method continues with S511, in which the second area is combined with the third area to generate a second pattern. In some embodiments, the second pattern can also be a character. As am example, the second area as shown in FIG. 7C would be combined with the third area as shown in FIG. 7D to generate a second pattern as shown in FIG. 7F.

In a further embodiment, the color of the third area in the second pattern could be adjusted to the same as the second area in the second pattern.

It should be understood that the description above just uses two overlapped patterns (such as, characters) as examples to describe the present invention. A picture with more than two overlapped patterns (such as, characters) could also be processed using the method mentioned above.

The diagrams depicted herein are illustrative. There can be many variations to the diagram, or the operations described therein without departing from the spirit of the invention. For instance, the steps can be performed in a differing order or steps can be added, deleted or modified. All these variations are considered a part of the specification.

The method 500 can be implemented by the computer system/server 12 of FIG. 1 or a computer node 10 in a cloud system. It should be noted that the method 500 is only illustrative and is not intended to suggest any limitation as to the scope of embodiments of the present invention.

It can be noted that the processing of an image according to embodiments of this disclosure could be implemented by a system 600 shown in FIG. 6. As FIG. 6 shows, the system 600 may comprise a data interface 610, an analysis module 620, and a storage module 630. The respective modules of the system 600 could be implemented by the computer system/server 12 in FIG. 1. In some embodiments, the data interface 610 receives data from, for example, a 3D scanner, and the analysis module 620 uses the data obtained from the data interface 610 to determine a first area, a second area and a third area. The refine module 630 receives the data of the first area, the second area, and the third area from the analysis module 620, and then generates the first pattern by combining the first area with the third area and generates the second pattern by combining the second area with the third area.

The modules in FIG. 6 are depicted for the purpose of describing embodiments of the disclosure. One or more modules shown in FIG. 6 may be omitted, combined as a single module, or divided into multiple sub modules without departing from the scope and spirit of the described embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some exemplary embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, data of a plurality of points sampled in a target area, wherein the data of each point of the plurality of points comprises position information and a height value, and wherein the position information indicates a position of a respective point in a reference plane of the target area and the height value indicates a vertical distance of the respective point to the reference plane;
determining, by one or more processors, a first area of the target area, wherein the height value of each point in the first area complies with a first range of height values, and wherein the first range corresponds to a first ink type;
determining, by one or more processors, a second area of the target area, wherein the height value of each point in the second area complies with a second range of height values, and wherein the second range corresponds to a second ink type;
determining, by one or more processors, a third area of the target area, wherein the height value of each point in the third area complies with a third range of height values, and wherein the third range is a sum of the first range and the second range; and
generating, by one or more processors, a first pattern that is a combination of the first area and the third area.

2. The computer-implemented method of claim 1, wherein the position information comprises a coordinate value of the respective point in a first direction of the reference plane and a coordinate value of the respective point in a second direction vertical to the first direction in the reference plane.

3. The computer-implemented method of claim 1, wherein determining the first area of the target area further comprises:
determining, by one or more processors, a first group of points from the plurality of points, wherein the height value of each point in the first group of points complies with the first range; and
determining, by one or more processors, the first area of the target area using the position information of each point in the first group of points.

4. The computer-implemented method of claim 1, wherein determining the second area of the target area further comprises:
determining, by one or more processors, a second group of points from the plurality of points, wherein the height value of each point in the second group of points complies with the second range; and
determining, by one or more processors, the second area of the target area using the position information of each point in the second group of points.

5. The computer-implemented method of claim 1, further comprising:
generating, by one or more processors, a second pattern that is a combination of the second area and the third area.

6. The computer-implemented method of claim 1, wherein the data of each point of the plurality of points is obtained from a three-dimensional (3D) scanner.

7. The computer-implemented method of claim 1, further comprising:
determining, by one or more processors, one or more sub areas of the first area, wherein respective texture features of the one or more sub areas are not consistent with a texture feature of a remaining part of the first area; and
updating, by one or more processors, the first area by excluding the one or more sub areas.

8. The computer-implemented method of claim 1, further comprising:
determining, by one or more processors, one or more sub areas of the second area, wherein respective texture features of the one or more sub areas are not consistent with a texture feature of a remaining part of the second area; and
updating, by one or more processors, the second area by excluding the one or more sub areas.

9. The computer-implemented method of claim 1, wherein a texture feature of the third area is consistent with a texture feature of the first area or a texture feature of the second area.

10. A computer system comprising:
one or more computer processors;
one or more computer readable storage media;
program instructions stored on the computer readable storage media for execution by at least one of the one or more processors, the program instructions comprising:
program instructions to obtain data of a plurality of points sampled in a target area, wherein the data of each point of the plurality of points comprises position information and a height value, and wherein the position information indicates a position of a respective point in a reference plane of the target area and the height value indicates a vertical distance of the respective point to the reference plane;
program instructions to determine a first area of the target area, wherein the height value of each point in the first area complies with a first range of height values, and wherein the first range corresponds to a first ink type;
program instructions to determine a second area of the target area, wherein the height value of each point in the second area complies with a second range of height values, and wherein the second range corresponds to a second ink type;
program instructions to determine a third area of the target area, wherein the height value of each point in the third area complies with a third range of height values, and wherein the third range is a sum of the first range and the second range; and
program instructions to generate a first pattern that is a combination of the first area and the third area.

11. The computer system of claim 10, wherein the position information of each point comprises a coordinate value of the point in a first direction of the reference plane, and a coordinate value of the point in a direction vertical to the first direction in the reference plane.

12. The computer system of claim 10, wherein the program instructions to determine the first area and the second area of the target area further comprises:
determining a first group of points from the plurality points, wherein the height value of each point of the plurality of points in the first group complies with the first range;
determining the first area of the target area using position information of each point of the plurality of points in the first group;
determining a second group of points from the plurality points, wherein the height value of each point of the plurality of points in the second group complies with the second range; and
determining the second area of the target area using position information of each point of the plurality of points in the second group.

13. The computer system of claim 10, further comprising:
program instructions to generate a second pattern that is a combination of the second area and the third area.

14. The computer system of claim 10, further comprising:
program instructions to determine one or more sub areas of the first area, wherein respective texture features of the one or more sub areas are not consistent with a texture feature of a remaining part of the first area; and
program instructions to update the first area by excluding the one or more sub areas.

15. The computer system of claim 10, further comprising:
program instructions to determine one or more sub areas of the second area, wherein respective texture features of the one or more sub areas are not consistent with a texture feature of a remaining part of the second area; and program instructions to update the second area by excluding the one or more sub areas.

16. The computer system of claim 10, wherein a texture feature of the third area is consistent with a texture feature of the first area or a texture feature of the second area.

17. A computer program product comprising:

one or more computer readable storage media and program instructions stored on the one or more computer readable storage media, the program instructions comprising:

program instructions to obtain data of a plurality of points sampled in a target area, wherein the data of each point of the plurality of points comprises position information and a height value, and wherein the position information indicates a position of a respective point in a reference plane of the target area and the height value indicates a vertical distance of the respective point to the reference plane;

program instructions to determine a first area of the target area, wherein the height value of each point in the first area complies with a first range of height values, and wherein the first range corresponds to a first ink type;

program instructions to determine a second area of the target area, wherein the height value of each point in the second area complies with a second range of height values, and wherein the second range corresponds to a second ink type;

program instructions to determine a third area of the target area, wherein the height value of each point in the third area complies with a third range of height values, and wherein the third range is a sum of the first range and the second range; and program instructions to generate a first pattern that is a combination of the first area and the third area.

* * * * *